Feb. 24, 1959

W. F. BAILEY 2,875,273

COLOR-TELEVISION PROJECTOR

Filed April 25, 1956

United States Patent Office 2,875,273

Patented Feb. 24, 1959

2,875,273

COLOR-TELEVISION PROJECTOR

William F. Bailey, Valley Stream, N. Y., assignor to Hazeltine Research, Inc., Chicago, Ill., a corporation of Illinois Application April 25, 1956, Serial No. 580,599

4 Claims. (Cl. 178—5.4)

Figure 1:
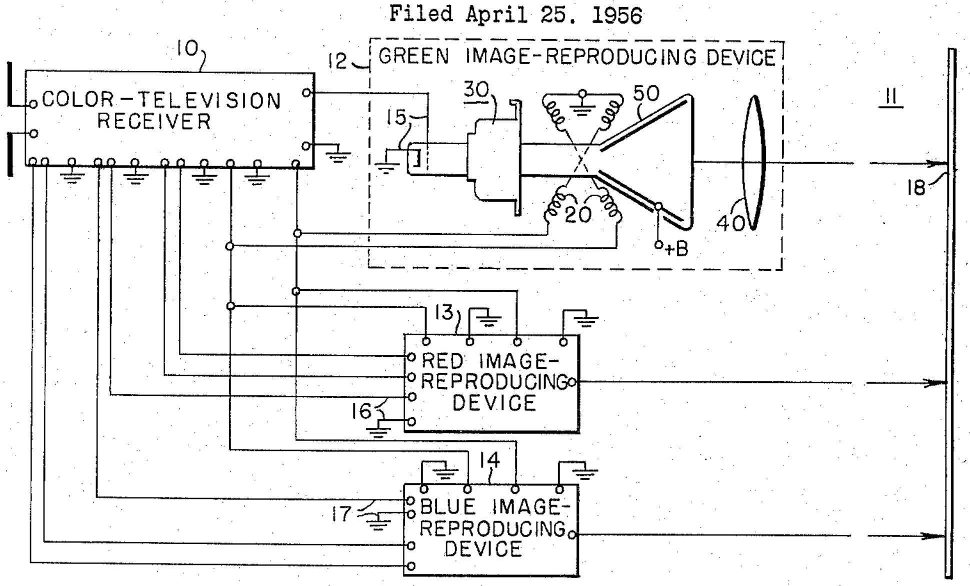

This invention relates to color-television projectors and, more particularly, to projectors of the type employing cathode-ray tubes with permanent magnet focus devices.

In color-television projectors, it is extremely important that component color images projected to a display screen be maintained in exact register to reproduce a composite multicolor image. I have found that in a projector employing cathode-ray tubes focused by means of permanent magnet devices, the stray field or leakage flux from the permanent magnet focus device associated with each tube causes distortion of the images developed by its own assoiated tube and the other tubes and results in a misregistration of the images projected to the display screen. Distortions of the individual image rasters which would be negligible if the rasters were individually viewed cause serious color fringing in the composite projected image.

It is an object of the present innvention, therefore, to provide a new and improved color-television projector in which misregistration of the projected component images due to the effects of stray fields of the permanent magnet focus devices of the projector is minimized.

In accordance with a particular form of the invention, a color-television projector for a color-television receiver having a display screen comprises circuit means for supplying signals representative of component color images to be reproduced. The projector includes a plurality of image-reproducing devices responsive to the aforesaid signals and including a plurality of cathode-ray tubes in proximity for developing component color images. The projector also includes optical means for projecting the component color images to a display screen in register to reproduce a composite multicolor image. The image-reproducing devices also include permanent magnet focus devices associated with the tubes for focusing the cathode-ray beams thereof and having minimized stray fields for minimizing the distortion effect of the focus device associated with each tube on images developed by that tube and the other tubes to minimize misregistration of the images.

For a better understanding of the present invention, together with other and further objects thereof, reference is had to the following description taken in connection with the accompanying drawing, and its scope will be pointed out in the appended claims.

Figure 2:
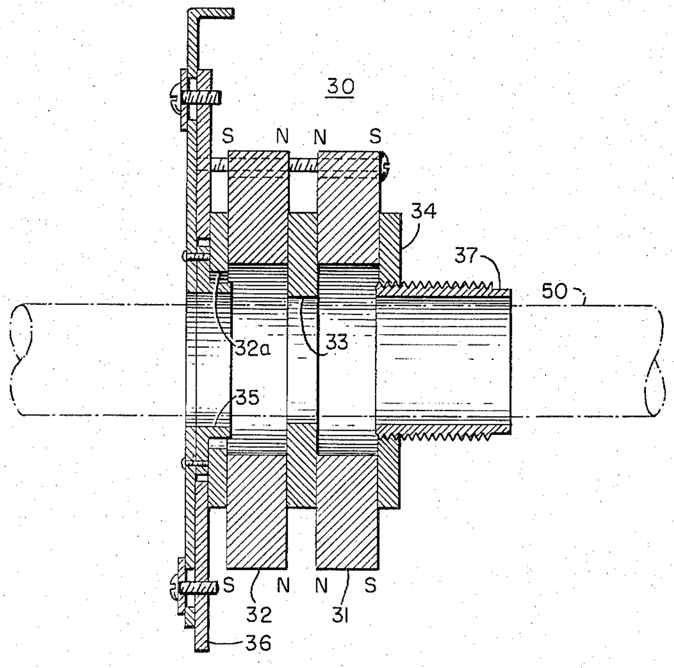

Referring to the drawing:

Fig. 1 is a circuit diagram, partly schematic, of a color-television receiver including a projector constructed in accordance with the invention, and Fig. 2 is a cross-sectional view of a permanent magnet focus device utilized in the Fig. 1 projector.

Referring now more particularly to Fig. 1 of the drawing, there is represented a color-television receiver 10 including conventional receiver circuits of a type more fully described in applicant's copending application Serial No. 429,941, filed May 14, 1954, and entitled "Color-Image-Reproducing Apparatus of the Projection Type." There is associated with the receiver 10 a color-television projector 11 including circuit means for supplying signals representative of component color images to be reproduced. More particularly, this circuit means comprises, for example, three input circuits of green, red, and blue image-reproducing devices 12, 13, and 14, respectively. In particular, input circuits 15, 16, 17 supply red, green, and blue video-frequency signals to control electrodes and cathodes of three cathode-ray tubes for developing, in conjunction with suitable light filters not shown, green, red, and blue color images for projection to a display screen 18 in register. The cathode-ray tubes preferably are positioned in proximity in the manner described in a copending application of John Marley, Serial No. 580,600, filed concurrently herewith, entitled "Color-Television Receiver."

The cathode-ray tube 50 of the green image-reproducing device 12 has the usual electrodes and has beam deflection windings 20 for causing the cathode-ray beam of the tube to scan the tube face. The beam deflection windings 20 preferably are constructed in accordance with the teachings of the above-identified Marley application. The device 12 also includes a permanent magnet beam focus device 30, more fully described hereinafter. There is also provided a suitable lens or other optical system represented for purposes of explanation by converging lens 40. Units 13 and 14 preferably are of similar construction to unit 12 with the exception that they include red and blue image-reproducing catchode-ray tubes, respectively.

Referring now to Fig. 2 of the drawing, the focus device for the green image-reproducing device 12 is there represented in cross-sectional view. The neck of the tube 50 is represented in phantom. This focus device is typical of the corresponding devices of the red and blue image-reproducing devices 13 and 14. The focus device 30 has a minimized stray field or leakage flux for minimizing the distortion effect of the focus device 30 on the images developed by the tube 50 and the tubes of the red and blue image-reproducing devices 13 and 14. More particularly, the focus device 30 comprises a pair of oppositely poled coaxial annular permanent magnets 31 and 32 of, for example, suitable ferrite material having polarities indicated in the drawing by the letters S and N. Annular pole pieces 32*a*, 33, 34 of ferrromagnetic material are attached to the magnets by suitable means. A ferromagnetic annulus 35 attached to a nonmagnetic support 36 of, for example, aluminum is provided for adjusting the position of the image raster on the tube face. A ferromagnetic shunt 37 is provided for controlling the focus field intensity to adjust the focus of the cathode-ray beam.

The focus field internal to the cathode-ray tube extends from the north pole to the south pole of each of the magnets and thus is effective to focus the cathode-ray beam of the tube. However, at a distance from the focus device 30 in the vicinity of the other cathode-ray tubes, the magnetic field of intensities of the two permanent magnets are approximately equal and opposite and, hence, the fields have substantial mutually canceling components to minimize the resultant stray field in the vicinity of the other tubes. In this manner, distortion of the images due to deflection of the cathode-ray beams of the other cathode-ray tubes by the stray field of the focus device 30 is minimized. Also, the resultant stray field from the focus device 30 in the vicinity of the deflection yoke of its own associated tube and, hence, the image distortion of that tube is minimized. Accordingly, misregistration of the projected images is substantially avoided.

From the foregoing description, it will be apparent that a color-television projector constructed in accordance with the invention has the advantage that misregistration of the projected component images due to the effects of stray fields of the permanent magnet focus devices of the projector is minimized.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-television projector, for a color-television receiver having a display screen, comprising: circuit means for supplying signals representative of component color images to be reproduced; a plurality of image-reproducing devices responsive to said signals and including a plurality of cathode-ray tubes in proximity for developing component color images; and optical means for projecting said component color images to a display screen in register to reproduce a composite multicolor image; said image-reproducing devices also including permanent magnet focus devices associated with said tubes for focusing the cathode-ray beams thereof and having minimized stray fields for minimizing the distortion effect of the focus device associated with each tube on images developed by that tube and the other tubes to minimize misregistration of said images.

2. A color-television projector, for a color-television receiver having a display screen, comprising: circuit means for supplying signals representative of component color images to be reproduced; three image-reproducing devices responsive to said signals and including three cathode-ray tubes in proximity for developing component color images; and optical means for projecting said component color images along converging light paths to a display screen in register to reproduce a composite multicolor image; said image-reproducing devices also including permanent magnet focus devices associated with said tubes for focusing the cathode-ray beams thereof and having minimized stray fields for minimizing the distortion effect of the focus device associated with each tube on images developed by that tube and the other tubes to minimize misregistration of said images.

3. A color-television projector, for a color-television receiver having a display screen, comprising: circuit means for supplying signals representative of component color images to be reproduced; a plurality of image-reproducing devices responsive to said signals and including a plurality of cathode-ray tubes in proximity for developing component color images; and optical means for projecting said component color images to a display screen in register to reproduce a composite multicolor image; said image-reproducing devices also including permanent magnet focus devices associated with said tubes for focusing the cathode-ray beams thereof and each of said focus devices associated with each tube comprising a pair of oppositely poled coaxial annular permanent magnets and annular pole pieces of ferromagnetic material for developing a minimized resultant stray field in the vicinity of its own and the other tubes to minimize misregistration of said images.

4. A color-television projector, for a color-television receiver having a display screen, comprising: circuit means for supplying signals representative of component color images to be reproduced; three image-reproducing devices responsive to said signals and including three cathode-ray tubes in proximity for developing component color images; and optical means for projecting said component color images along converging light paths to a display screen in register to reproduce a composite multicolor image; said image-reproducing devices also including permanent magnet focus devices associated with said tubes for focusing the cathode-ray beams thereof and each of said focus devices associated with each tube comprising a pair of oppositely poled coaxial annular permanent magnets and annular pole pieces of ferromagnetic material for developing a minimized resultant stray field in the vicinity of its own and the other tubes to minimize misregistration of said images.

References Cited in the file of this patent

UNITED STATES PATENTS

| | | |
|---|---|---|
| 2,744,951 | Gibson | May 8, 1956 |
| 2,790,920 | Todd | Apr. 30, 1957 |